United States Patent [19]
Francioni et al.

[11] Patent Number: 5,634,551
[45] Date of Patent: Jun. 3, 1997

[54] METHOD AND APPARATUS FOR REGULATING THE ADVANCING MOVEMENT OF ARTICLES, FOR EXAMPLE IN INSTALLATIONS FOR THE AUTOMATIC PACKAGING OF FOOD PRODUCTS

[75] Inventors: Renzo Francioni, Prato Sesia; Duilio Pavese, Borgosesia, both of Italy

[73] Assignee: Cavanna S.p.A., Prato Sesia, Italy

[21] Appl. No.: 499,269

[22] Filed: Jul. 7, 1995

[30] Foreign Application Priority Data

Jul. 20, 1994 [IT] Italy ................. TO94A0597

[51] Int. Cl.⁶ ..................................... B65G 47/31
[52] U.S. Cl. .......................... 198/460.1; 198/461.1
[58] Field of Search .................... 198/460.1, 460.2, 198/460.3, 461.1, 461.2, 461.3

[56] References Cited

U.S. PATENT DOCUMENTS

| | | | |
|---|---|---|---|
| 4,640,408 | 2/1987 | Eaves | 198/460.1 |
| 4,717,013 | 1/1988 | Reissmann et al. | 198/461.1 |
| 4,921,092 | 5/1990 | Crawford et al. | 198/460.1 |
| 4,962,844 | 10/1990 | Francioni | 198/461.1 |
| 4,991,708 | 2/1991 | Francioni | 198/419.2 |
| 5,082,103 | 1/1992 | Ross et al. | 198/460.1 |
| 5,097,939 | 3/1992 | Shanklin et al. | 198/460.1 X |
| 5,168,163 | 12/1992 | Francioni | 250/359.1 |
| 5,170,877 | 12/1992 | Francioni | 198/358 |

FOREIGN PATENT DOCUMENTS

| | | | |
|---|---|---|---|
| 1412679 | 11/1972 | United Kingdom . | |
| 2098157 | 11/1982 | United Kingdom | 198/461.3 |

*Primary Examiner*—James R. Bidwell
*Attorney, Agent, or Firm*—Trask, Britt & Rossa

[57] ABSTRACT

A device for regulating the advancing movement of articles in a given direction comprises a plurality of conveyors, such as for example belt conveyors, between an input supply conveyor and a positive drive output conveyor operating to supply, for example, a packaging machine. In order to adapt automatically to the handling of articles with different lengths, at least some of the aforesaid conveyors, intended to perform a phasing action of the advancing movement of the articles, are chosen with different lengths so as to form a set which is able to deal with the possible range of variation in the length of the articles dealt with, by coupling several conveyors in cascade. Preferably, the conveyor at the downstream end has a selectively controllable length varied in dependence on the length of the articles being handled.

20 Claims, 4 Drawing Sheets

METHOD AND APPARATUS FOR REGULATING THE ADVANCING MOVEMENT OF ARTICLES, FOR EXAMPLE IN INSTALLATIONS FOR THE AUTOMATIC PACKAGING OF FOOD PRODUCTS

TECHNICAL FIELD

The present invention relates to the problem of regulating the advancing movement of articles, more specifically to a device having the characteristics referred to in the preamble to claim 1.

STATEMENT OF THE ART

Devices of this type are widely known in the art, such as documented, for example, by the documents GB-1 412 679, U.S. Pat. No. 4,991,708, U.S. Pat. No. 4,962,844, U.S. Pat. No. 5,168,163, U.S. Pat. No. 5,170,877, all assigned to the same assignee of the present application.

In particular, devices of the type specified above are intended to generate from a continuous or substantially continuous stream of articles, an ordered stream of articles which advance at an exact, predetermined distance from each other with a precise space-time relationship (so called "phase" or "phasing") with respect to the operating cycle of a treatment unit situated downstream. Such a unit might be, for example, a packaging machine of the type usually known as "form-fill-seal" (ffs) or "flow pack".

Usually, the operation of devices of this type is based on the principle of creating on an upstream conveyor (the terms "upstream" and "downstream" in the following description refer to the normal direction of advance of the articles to be packaged) a certain accumulation or gathering (that is to say a storage set) of articles. Such articles are then taken in an ordered way so as to be spaced from one another by virtue of the relative speeds of the conveyors on which they consecutively start, with the further possibility of obtaining the desired space-time arrangement ("phasing") by accelerating and/or decelerating the motion of the various conveyors by means of sensing signals generated by sensors (such as for example optical sensors) so as to determine the position of the individual article being conveyed.

For a complete illustration of such criteria, reference is made to the detailed descriptions in the cited documents.

In the practical utilization of devices of the type specified above, it is seen that optimum effectiveness of the phasing action (which can be achieved by successive interventions—on the same article on different conveyors in cascade) is achieved optimally when there is a certain relationship between the length of the conveyor (measured in the direction of advance of the articles) and the length of the articles (measured in the same direction).

For example, a conveyor which is, so to speak, "too short", is unable to act effectively on an article which is longer than that conveyor; in practice, the article will always end up bridged between the conveyor in question and at least one of the upstream or downstream conveyors.

The situation which arises in the presence of a conveyor that is, "too long" is however far worse, that is a conveyor, the length of which is a multiple especially of a high order, of the length of the article. In this case, the normal conditions of use are, in fact, such that two or more articles may be located simultaneously on the conveyor. The corrective action (for example slowing down) applied to one article may however be exactly the opposite of what is needed to achieve the exact phasing of the article immediately following (for example, acceleration). Corrective action attempted where the conveyor is too long can therefore be not only ineffective, but can actually worsen the situation of the articles with respect to the desired phasing conditions.

SUMMARY OF THE INVENTION

Experiments conducted by the applicant demonstrate that the optimum condition, in terms of the effectiveness of the phasing action, is usually achieved when the length of the conveyor is approximately one and a half times that of the article.

To take account of this fact, it has already been proposed in the prior art to make devices of the type specified above which are configured in such a way that the conveyor or conveyors which carry out the phasing action can be replaced by a conveyor or conveyors of different lengths so as to be able to achieve—at least approximately—the required adaptation condition. At least in some cases, taking account of the fact that the conveyors in question are usually belt conveyors, the required adaptation can be obtained simply by substituting, for example, the belts of two conveyors in cascade with a single belt, the active pass of which has a length approximately equal to the sum of the active passes of the two conveyors, the belts of which have been replaced.

Both the substitution of the conveyor in its entirety, and the substitution of only the belt constitute operations sufficiently taxing as to require the intervention of experts, especially with regards to adjustment before the device is restarted. It must not be forgotten that in automatic packaging systems, there is a marked tendency to automate as much as possible the "format change" operation, that is the adaptation of the packaging device for handling articles of different shapes than the articles previously dealt with.

The object of the present invention is to provide a device of the type specified above which is well able to satisfy the demands expressed above.

According to the present invention, this object is achieved by means of a device having the characteristics specifically referred to in the following claims. Another object of the invention is an associated control procedure.

DETAILED DESCRIPTION OF THE ILLUSTRATED EMBODIMENT

The invention will now be described, purely by way of non-limitative example, with reference to the accompanying drawings, comprising FIGS. 1 to 7 which illustrate different adjustment conditions of a device according to the invention based on the necessity to handle articles having different dimensions.

The device according to the invention, generally indicated 1, is substantially constituted by a cascade of conveyors made, in the most up to date way, from motorized belt conveyors. Such a device can be used, for example, to regulate the advancement of articles such as, for example, food products such as biscuits, chocolates, blocks of food material, etc., within the range of an automatic production and/or packaging system.

For simplicity, it can be supposed that such articles (biscuits, bars of chocolate, etc.) are made, for example, from blocks of an approximately parallelepiped shape with a rectangular base. The width of such articles (that is to say, the dimension in the direction transverse the advancing motion, that is, orthogonal to the plane of the sheet, with reference to the drawings) is not in itself particularly relevant to the understanding of the invention, nor is the height (the dimension perpendicular to the transport plane of the conveyor). The length, that is to say, the dimension measured in the general direction of advancing motion of the articles along the conveyor 1, is however significant.

For clarity and simplicity of illustration, in FIGS. 1 to 7 the articles have been progressively numbered A1, A2 ... A7 (a single article is shown in each drawing, on the most upstream conveyor in relation to the direction of advancing motion of the articles, meaning from left to right) with gradually increasing dimensions.

In particular, in order to assist understanding, the articles in question may be considered to have lengths of the order of those indicated below:
A1 30–40 mm
A2 40–52 mm
A3 52–67.5 mm
A4 67.6–87.88 mm
A5 87.88–114mm
A6 114–148.5mm
A7 greater than 148.5 mm A salient characteristic of the device according to the invention is given by the fact that, without altering its mechanical structure, it is able to adapt to the varying lengths of the conveyed articles by being able to perform the phasing action in optimum conditions.

In particular, in all the illustrated configurations, 1 indicates an input conveyor, with a metering function, upon which the articles A1, A2 ... A7 accumulate, that is to say, with each article in contact with the one following it. Reference 0 indicates an output conveyor, in the illustrated embodiment, in the form of a positive traction conveyor comprising a drive chain 01 which passes over a set of related pulleys and upon which traction elements such as prongs N are mounted (only one of which is shown in the drawing for simplicity of illustration).

The arrangement (which is fully known in itself) is such that the prongs N which are carried by the drive chain 01 move up from below the device 1 (particularly in the downstream conveyor), in order to accept the articles with a view to supplying them to a downstream handling station.

Such a station (not specifically shown in the drawings) can be, for example, a packaging machine of the type usually known as ffs or flow-pack. For a general illustration of the coupling of a device generally similar to the device 1 with such a machine, reference may usefully be made to U.S. Pat. No. 4,914,889.

The references II, III, IV, V and VI indicate a plurality of driven conveyors (in the following description, for the purpose of example, driven belt conveyors will always be referred to), arranged in cascade between the metering conveyor 1 and the output conveyor 0, the prongs N of which emerge from below between the paired belts on strips from which the conveyor VI (in a way known per se) is made.

All of the conveyors I to VI are driven by respective motors (for example electric motors—not shown) in dependence on related command signals originating from a general control unit U constituted, for example, by a so-called programmable logic controller or PLC. All of this is well known in the prior art and is not relevant to the understanding of the invention, so does not require description.

Similarly known is the fact that the command signals for the motors which drive conveyors I to VI are supplied by the PLC U as a function of a "master" signal MX controlling the motion of the device 1, corresponding to the speed (and to the phase) of advancement of the output conveyor 0, usually subject (if it is by the effect of coupling to a mechanical transmission) to the movement of the handling station situated downstream, taking account of signals originating from a photocell assembly (or similar sensing devices), associated with the different conveyors and indicated respectively by the references FC1, FC2, FC3, FC4, FC5 and FC6. Such sensors, widely known in the prior art, can be constituted, for example, by optical barrier detection devices currently available from the Erwin Sick Company (Germany). In a particularly advantageous arrangement for the working of the invention, each photocell is positioned at the output end of a related conveyor, straddling that conveyor and the one immediately following.

Thus, photocell FC1 is positioned at the output end of conveyor I in such a way as to fulfil its function as an optical barrier detector in the gap between conveyor I and the successive conveyor II. Similarly, photocell FC2 is positioned at the output end of conveyor II, photocell FC3 at the output end of conveyor III, photocell FC4 at the output end of conveyor IV, and photocell FC5 at the output end of conveyor V.

Photocell FC6 is an exception to this general rule, in that it acts at conveyor VI but, instead of being in a fixed position, it is mounted on a housing or moving element 2 which moves in a longitudinal direction with respect to the device 1 according to criteria which are better illustrated in the following.

From a comparison of FIGS. 1 to 7 it will be seen that the different drawings show different possible connection configurations between the PLC U and the drives of the various conveyors I to VI. The representation adopted in the accompanying drawings is by nature symbolic. In fact, although the PLC U is physically stably joined to the drive of all of the conveyors in question, sometimes only those connection lines which are needed at the time in question to develop the phasing action on the articles are represented in the drawings.

Figure 1:
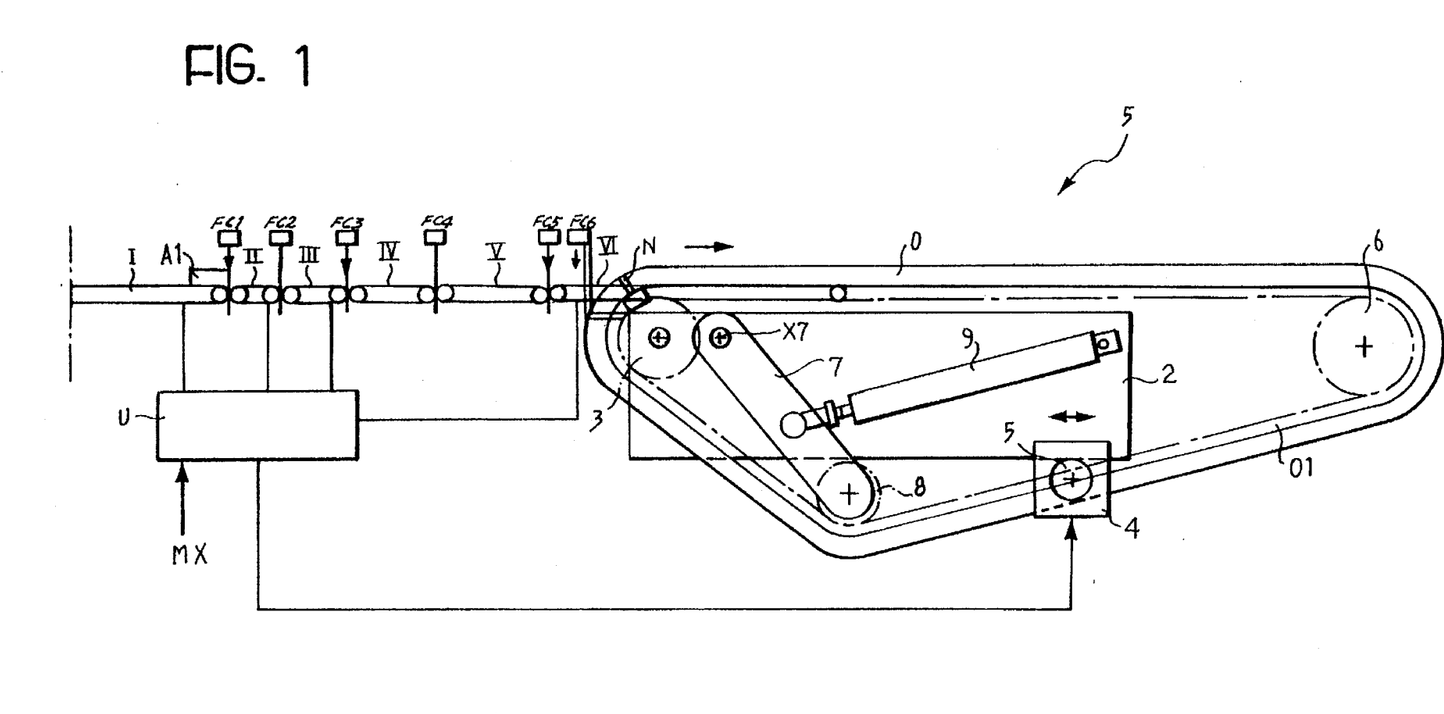
Figure 2:
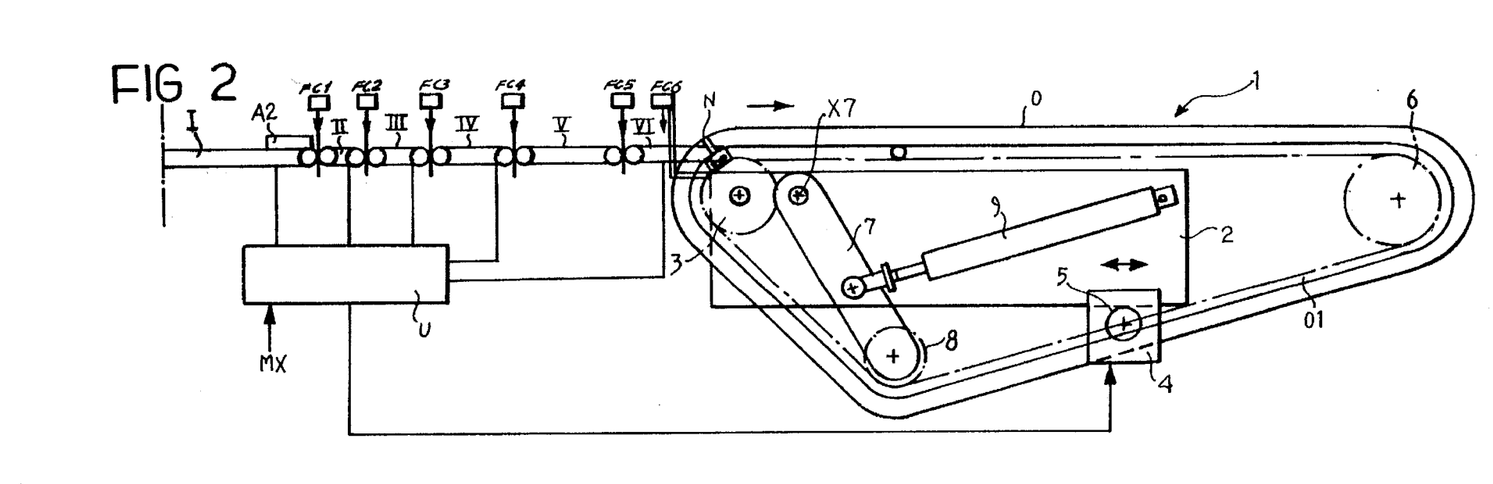
Figure 7:
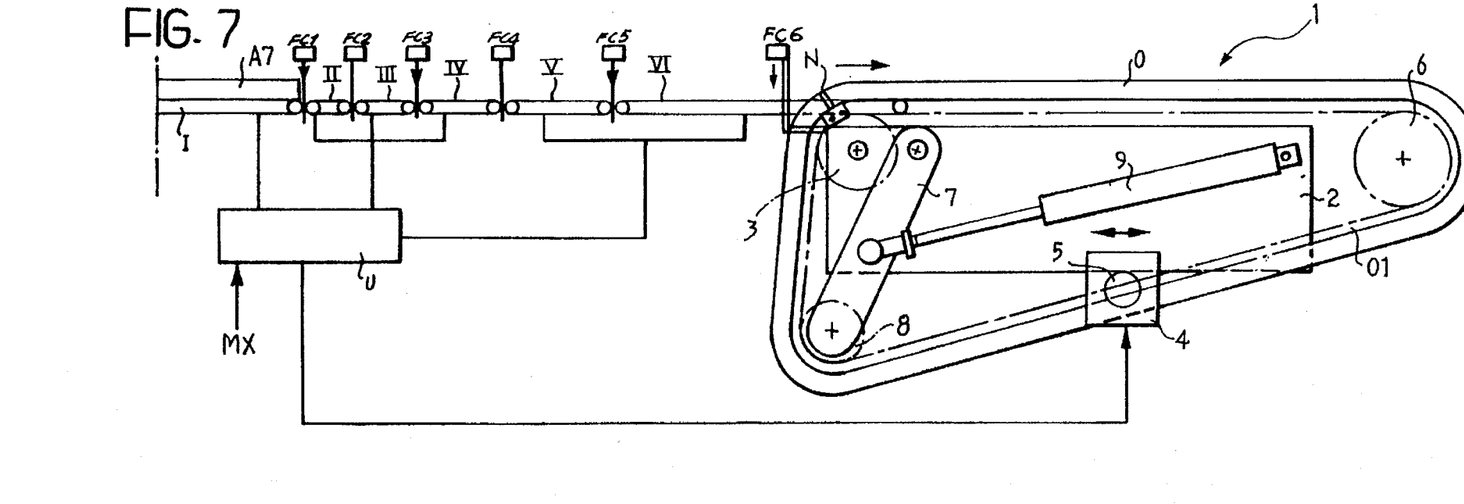

Thus, for example, in FIG. 1 the PLC U performs the phasing by controlling the drive to the conveyors I, II, III and VI, while in the arrangement illustrated in FIG. 2, the PLC U simultaneously controls the drive of all the conveyors, except conveyor V, in order to put the products in phase. Again, FIG. 7 is intended to indicate that the PLC U controls the drive of conveyors II, III and IV in a related way (that is by making them move at the same speed); this is also true for the drive of conveyors V and VI.

The conveyors which in one drawing are shown as not connected to the controller U (for example conveyors IV and V in FIG. 1 or conveyor V in FIG. 2) are however active for conveying articles. The apparent disconnection from the PLC U only means that at the time they are not subject to the action which regulates the speed of advancing motion, and therefore the phasing of the articles A controlled by the PLC U. These conveyors, illustrated as ideally disconnected from the PLC U and which in the following detailed description are sometimes defined as "deactivated", move with, a constant speed (fixed as a function of the linear speed of advance of the prongs N on the output chain 01), without accelerating or decelerating the articles in transit upon it, as however happens for the conveyors involved in the phasing action. The "activation" and "deactivation" of the conveyors refers therefore to the performance of the phasing action, not—absolutely—to the fact that such conveyors are or are not in motion.

With the same convention, an arrow next to one of photocells FC1 ... FC6 indicates the fact that the photocell is activated at that moment, supplying to the PLC U (by means of connection lines not explicitly illustrated so as not excessively to complicate the drawings) a corresponding sensing signal used for the phasing action. Thus, for example, in the condition illustrated in FIG. 1, photocells FC1, FC2, FC3 and FC6 are active while, for example, in the condition illustrated in FIG. 6, photocells FC1, FC3 and FC5 are active.

It will be noted that, in general, the drive to the input conveyor I, on which the products to be phased accumulate, is constantly subjected to the action of the PLC U as a function of the sensing signal from photocell FC1, and is kept constantly active; this fact is brought about in consideration of the function of conveyor 1, which is that it delivers articles in a metered fashion to the downstream conveyors, intended actually to perform the phasing. It will likewise be noted that conveyor VI, which cooperates with the output conveyor 0, is constantly active as a timer belt, but with a variable length of the active part (according to criteria which will be better described in the following) as a consequence of variation of the geometry of the output conveyor 0.

Such geometry variation is essentially obtained by translating the movable element 2 upon which it is mounted, together with photocell FC6, and the upstream return wheel 3 of the chain 01.

The longitudinal translation movement of the movable element 2 with respect to the device 1 is achieved on guides (not illustrated specifically in the drawings, which assume—for clarity of illustration—an intentionally schematic form) through the action of a motor 4 which is controlled by the PLC U. For example, the motor 4 is constituted by a bi-directional electric motor, mounted in a fixed position with respect to the device 1, on the output shaft on which a pinion 5 is fitted which engages with a rack (not illustrated in the drawings) attached to the moving element 2. Since it is usually preferred that the downstream return wheel 6 of the chain 01 is in a fixed position with respect to device 1, it is necessary to fit the chain 01 with a tensioner, for example an arm 7 pivotally mounted to turn about an axis X7 at its upper extremity.

The arm 7 carries at its lower end a wheel or roller chain tensioner 8 which cooperates with the chain 01 and which is attached in an intermediate position to an elastic mechanism 9 such as a spring (for example a gas spring) which acts between the moving element 2 and the arm 7 by forcing the latter to turn (clockwise with reference to the point of view of the Figure) which causes tensioning of the chain 01.

The "net" length of the upper transport pass of conveyor VI situated in a downstream end position of conveyors I to VI is given by the distance between the input end of that conveyor and the point at which the prongs N on the conveyor 0 emerge from below between the two belts which form the conveyor in question. The net length can therefore be selectively controlled as a function of the geometry of the output conveyor 0, and thus of the position reached by the motor 4, controlled by the PLC U.

Essentially, the device 1 according to the invention works on the criteria of making at least some of the various phaser conveyors in the form of a range of conveyors of different length, by activating, for the performance of the phasing operation (which is preferably performed—to allow greater precision of intervention—by general conveyors in cascade,) an associated selectively determined combination of just those conveyors where the length is sufficiently close to the length of the articles being dealt with (for example in the ratio of one and a half cited above).

Consequently, only short conveyors from the range are used for the phasing of "short" articles. Conversely, the phasing of "long" articles uses only long conveyors, made—if appropriate—by electronically combining several conveyors of shorter length, as is better illustrated in the following.

As for conveyor VI, situated in an end position, immediately upstream of the output conveyor 0, its length is automatically modified, adapting it to the varying dimensions of the articles being dealt with by modifying the geometry of the chain conveyor 0.

None of this requires any manual substitution or modification of the conveyors or parts thereof; it is a question therefore of intervention which can arise automatically simply by acting (according to criteria within the scope of the man skilled in the art, in particular, those skilled in programming PLC devices) on the control functions of the PLC U with respect to the various conveyor drives, as a function of the signals from the various photocells FC1 ... FC6. It will also be noted that the same PLC U is also able to act on the motor 4 so as to vary selectively the geometry of the output chain conveyor 0.

Referring specifically to the range of variability in the length of the articles cited in the introductory part of the present description, conveyors II to V could have lengths of the order, respectively, of 52, 67.6, 87.88 and 114.24 mm. These are values of a purely illustrative nature, which are not binding, and are referred to as the possible range of variation in length of the articles cited above. In particular, it is appreciated that the lengths of conveyors II, III, IV, V, to which earlier reference is made are those for which, indicating the length of a single conveyor as $l_i$ where i=II to IV, a general relationship exists of the type $l_{i+1}/l_i$–1.2.

In the arrangement illustrated in FIG. 1, adopted to deal with short articles (articles A1 of a length of between 30–40 mm, with reference to the previously cited dimensions), the PLC U is supplied with sensing signals from photocells FC1, FC2, FC3 and FC6 and controls (for performance of the phasing action) the drive of conveyors I, II, III and VI.

In particular, conveyor I acts as the conveyor for delivering articles A1, while conveyors II and III perform the actual phasing function of the articles in question. Conveyors IV and V are, with regards to the timing function, "deactivated" and therefore neutral in the sense that they move with constant velocity and neither accelerate nor decelerate the movement of the articles being conveyed. The phasing action is finally perfected by conveyor VI, the length of which is minimal (adjustment of the moving element 2 in such a way that the distance which separates the upstream end of conveyor VI from the point of intervention of the prongs N is practically of the same order of magnitude as the length of the products).

Whenever slightly longer articles need to be conveyed (for example articles A2 with a length of between 40 and 52 mm), the PLC U modifies the intervention arrangement by slightly lengthening the active part of the conveyor VI (that is to say, by re-positioning the moving element 2 slightly downstream), then by adapting itself to activate—always so as to effect the phasing action—photocells FC1, FC2, FC3, FC4 and FC6 as well as the drive of conveyors I, II, III, IV and VI (C.F. FIG. 2).

In this case, besides conveyor 1, which acts as always as the metering conveyor, conveyor II and—particularly—conveyors III and IV are also active in the performance of the phasing action, together with conveyor VI situated at the terminal position.

When even longer articles A3 (52–67.5 mm) need to be dealt with, the PLC U intervenes by positioning the moving element 2 further back and deactivating, with respect to the configuration as described in FIG. 2, photocell FC2 and the drive of the corresponding conveyor II which thereafter moves with constant velocity; this conveyor would in fact be too short to perform an effective phasing action on the articles in question. In this case (as referred to in FIG. 3), conveyor I still acts as always as a supplier, while the other conveyors in cascade achieve the required phasing, with an increasingly precise level of approximation.

Figure 4:
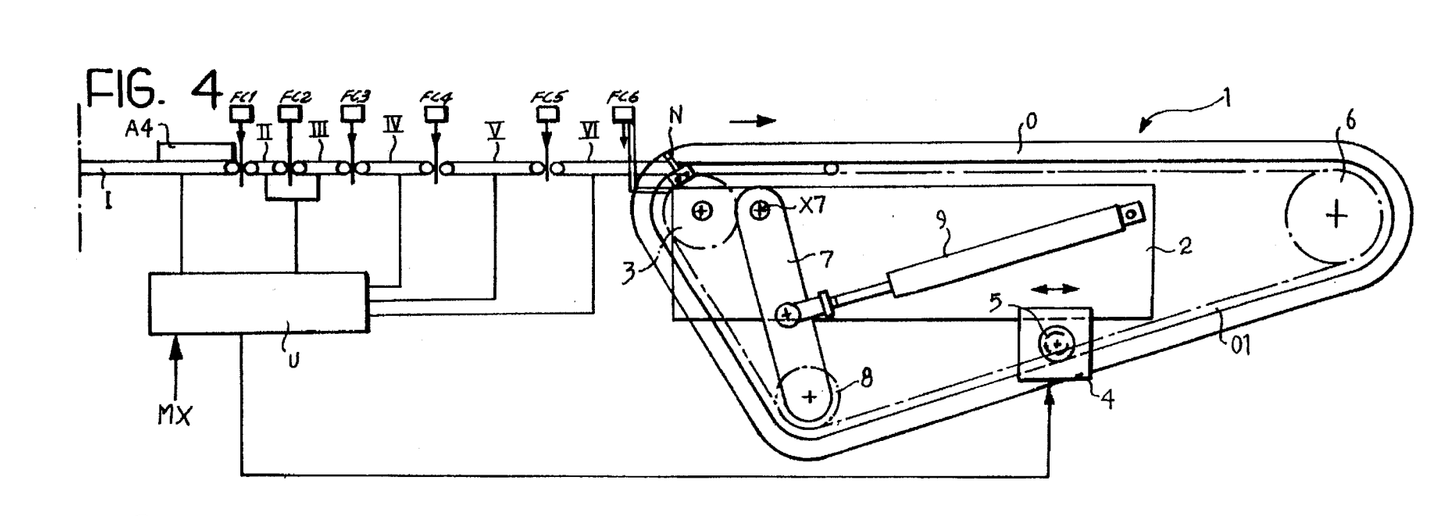

The arrangement illustrated in FIG. 4 shows how it is possible to utilize several combined conveyors in cascade to deal with articles A4 of even greater length (between 67.6 and 87.88 mm).

Figure 3:
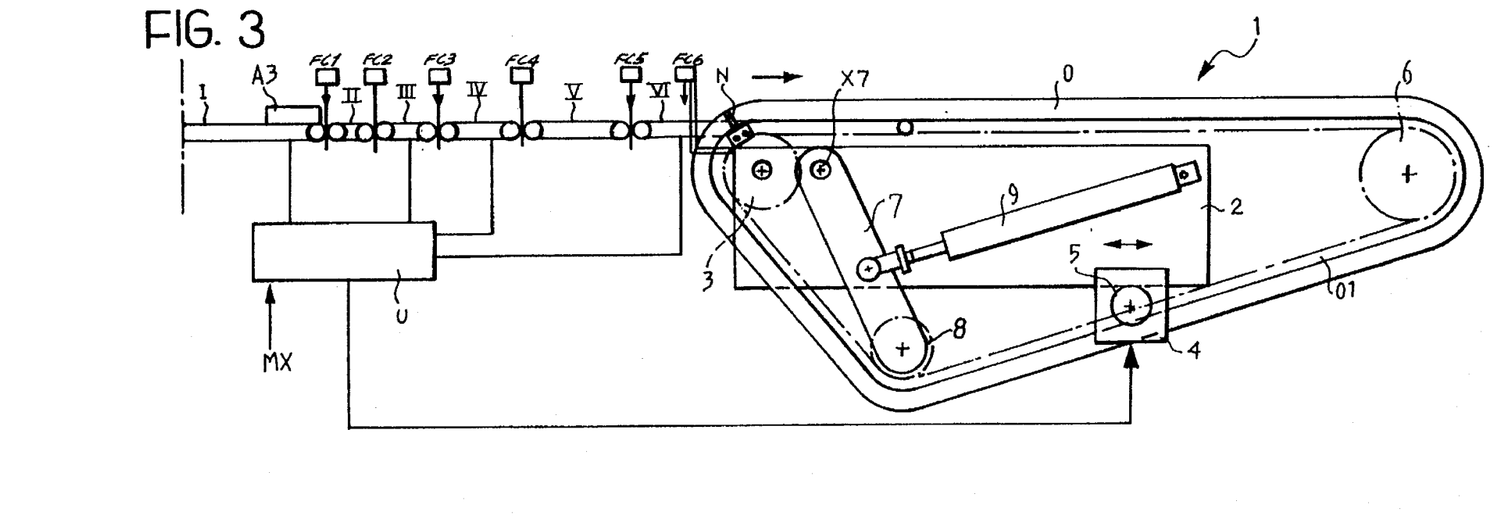

In such an arrangement, in fact, besides positioning the moving element 2 further downstream such that the length of the active part of conveyor VI corresponds to the length of the articles being dealt with, the PLC U modifies the control arrangement with respect to that shown in FIG. 3 by re-activating the drive of conveyor II and coupling it to conveyor III in such a way that conveyors II and III act as a single conveyor which is controlled by the PLC U as a function of the sensor signal from photocell FC3 situated at the exit end of the assembly comprising conveyors II and III.

In practice, in the arrangement shown in FIG. 4, the phasing action is carried out by conveyors II and III (acting in tandem as a single conveyor the length of which is equal to the sum of the lengths of the coupled conveyors), conveyor IV, conveyor V and conveyor VI, as well as by conveyor I.

Figure 5:
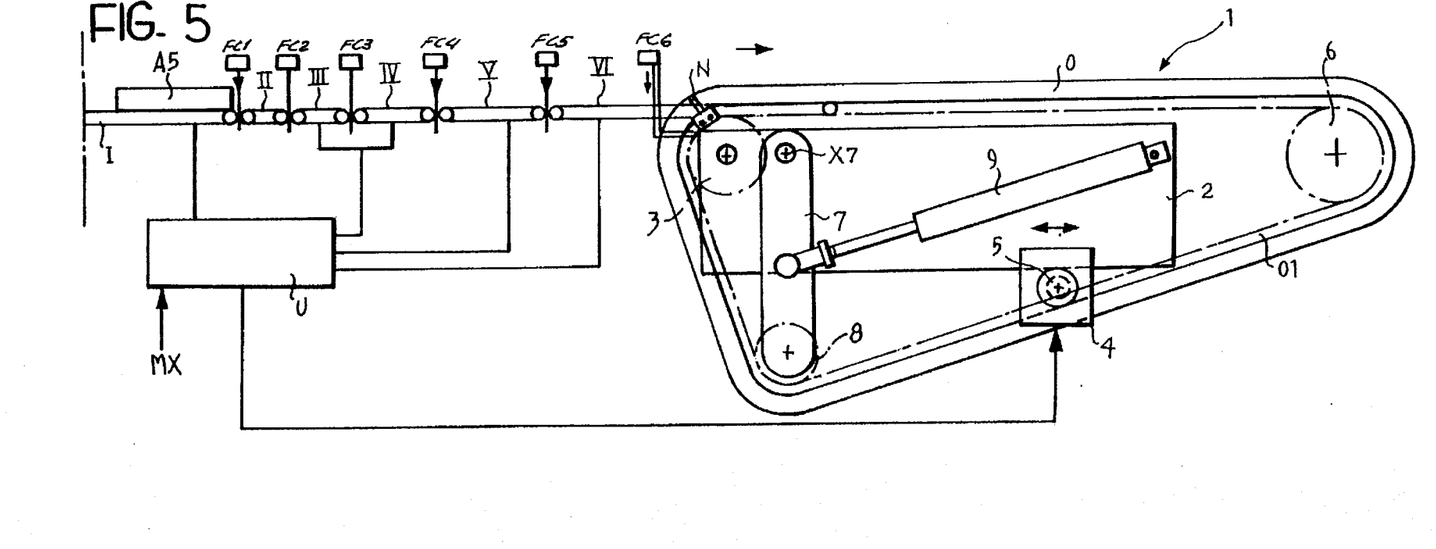

FIG. 5 shows how, when dealing with articles A5 of a length between 87.88 and 114 mm, the possibility of tandem coupling applies to conveyors III and IV, which then function as a single conveyor in dependence on the signal generated by photocell FC4. Conveyor II is de-activated (referring, as always, to the phasing function), as is the associated photocell FC2, while conveyors V and VI continue to act as phaser conveyors, controlled by the signals from respective photocells FC5 and FC6.

Figure 6:
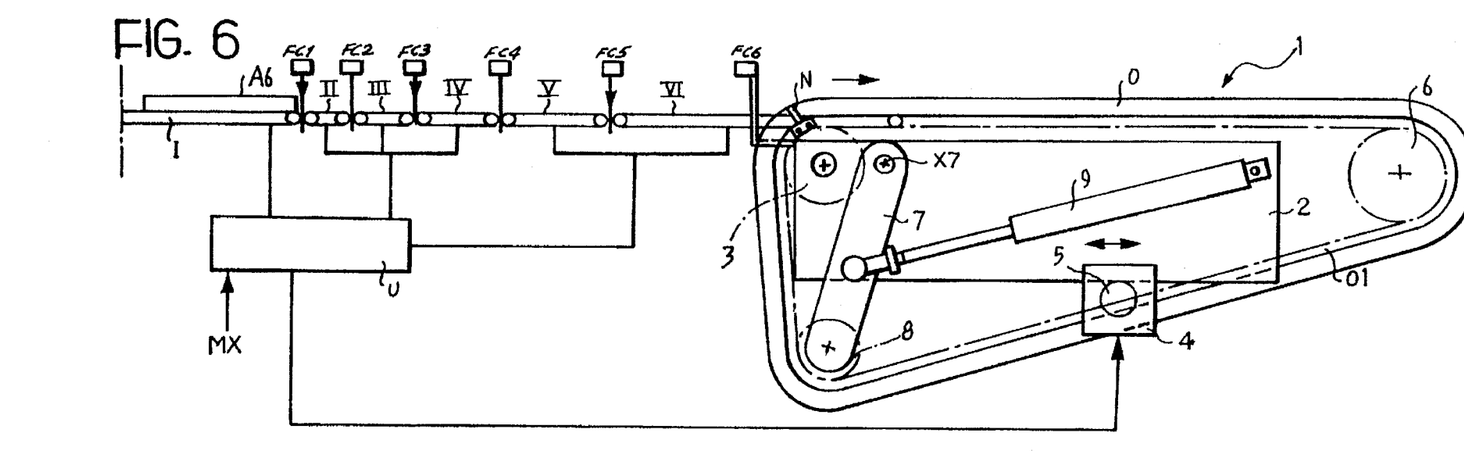

With regards to even longer articles (the configuration of FIG. 6 shows articles A6 with a length of the order of 114–148.5 mm), the possibility exists of further tandem coupling of conveyors.

In this case, in addition to positioning the moving element 2 further downstream, the PLC U couples the drive of conveyors II, III and IV in such a way that these conveyors, act as a single conveyor the length of which is equal to the sum of the three coupled conveyors and the movement of which is controlled in dependence on the sensor signal generated by photocell FC3. Similarly, conveyors V and VI are coupled, with regards to drive, so as to act as a single conveyor, controlled by the signal from photocell FC5.

Therefore, in the configuration of FIG. 6, conveyor I continues to act as the supplier in dependence on the signal from photocell FC1, while conveyors II, III and IV—operating at the same speed—on the one hand, and conveyors V and VI—also all working at the same speed—on the other hand, achieve the desired phasing operation.

By comparing the configuration of FIG. 6 with the preceding Figures, it will be apparent that, while in FIGS. 1 to 5 the operation of each conveyor active for phasing is controlled in dependence on the sensor signal from a photocell situated at the exit end of that conveyor, the configuration seen in FIG. 6 (the same is also true of the configuration shown in FIG. 7, as will be better seen in the following) is also controlled in dependence on the sensing action of photocells (FC3 and FC5) situated not at the output end of the conveyors working in tandem as a single conveyor but in a generally intermediate position with respect to the assembly of coupled conveyors.

Experience acquired from years of research shows in fact that, for the performance of the phasing action, control in dependence on a sensor signal from an intermediate position with respect to the conveyor is preferable to control in dependence on a sensor signal from the output end.

On the other hand, locating a photocell at the output end of a conveyor such that the photocell operates in the gap between the adjacent ends of two conveyors in cascade is advantageous in terms of reliability and clarity of sensing. The configuration shown in FIG. 6 ideally combines the two requirements, by controlling the phasing in dependence on a sensor signal taken from an intermediate position with respect to an assembly of conveyors which operate at the same speed velocity (being electronically connected) with the possibility of utilizing a sensor signal taken from the gap between successive conveyors.

As has already been said, the configuration illustrated in FIG. 7 concerns the phasing of articles of considerable length, and to this end, the movable element 2 is moved back as far as possible. The connection configuration is substantially identical to that illustrated in FIG. 6, with the exception that the phasing action of conveyors V and VI, which are electronically connected together, is achieved in dependence on the sensor signal from photocell FC6 which, with respect to the configuration illustrated in FIG. 6, has been positioned further back by the effect of the operation of the motor 4. This option, although not imperative, may be needed due to the fact that, in the presence of very long articles, the sensor signal from photocell FC6 is found to be more preferable for effecting the phasing action by conveyors V and VI than the signal from photocell FC5 which, in the presence of very long articles, may be too close to the input end of the group of conveyors V and VI.

Naturally, the principle of the invention remaining the same, the manufacturing particulars and the embodiments can be widely varied with respect to that which has been described and illustrated, without departing from the scope of the present invention.

What is claimed is:

1. In a device for regulating the advancing movement of articles in a given direction comprising:

a plurality of phaser conveyers positioned in cascade, said phaser conveyors determining said given direction, control means associated with said phaser conveyors for selectively controlling the speed of movement of said phaser conveyors whereby correspondingly to vary the speed of advancing motion of said articles carried on said phaser conveyors, the improvement wherein:

at least some of said phaser conveyors are made of a different length from one another as measured in said given direction whereby to constitute a set;

said control means acts to control the speed of movement of selectively determined combinations of said phaser conveyors of said set in dependence on the length of the said articles in said given direction.

2. The device of claim 1, wherein each said phaser conveyor of said set has a length which corresponds to a respective possible range of variation of said lengths of said articles in said given direction.

3. The device of claim 2, wherein each said phaser conveyor of said set has a length which corresponds to approximately one and a half times the length of said articles in said possible range of variation of article lengths.

4. In a device for regulating the advancing movement of articles in a given direction comprising:

a plurality of phaser conveyors positioned in cascade, said phaser conveyors determining said given direction;

control means associated with said phaser conveyors for selectively controlling the speed of movement of said phaser conveyors whereby correspondingly to vary the speed of advancing motion of said articles carried on said phaser conveyors;

the improvement wherein:

at least some of said phaser conveyors are made of a different length from one another as measured in said given direction whereby to constitute a set;

said control means acts to control the speed of movement of selectively determined combinations of said phaser conveyors of said set in dependence on the length of the said articles in said given direction;

wherein the phaser conveyors of said set have gradually increasing lengths, such that the length of each said phaser conveyor of said set immediately downstream of a phaser conveyor of said set upstream thereof is equal to approximately 1.2 times the length of said upstream phaser conveyor.

5. The device of claim 1, wherein said control means is operable to couple a plurality of said phaser conveyors of said set together such that the coupled said phaser conveyors act as a single conveyor with a length equal to the sum of the lengths of the individual coupled said phaser conveyors.

6. The device of claim 1, wherein said control means includes associated sensor means, each of which is located at the end of a related phaser conveyor.

7. In a device for regulating the advancing movement of articles in a given direction comprising:

a plurality of phaser conveyors positioned in cascade, said phaser conveyors determining said given direction;

control means associated with said phaser conveyors for selectively controlling the speed of movement of said phaser conveyors whereby correspondingly to vary the speed of advancing motion of said articles carried on said phaser conveyors;

the improvement wherein:

at least some of said phaser conveyors are made of a different length from one another as measured in said given direction whereby to constitute a set;

said control means acts to control the speed of movement of selectively determined combinations of said phaser conveyors of said set in dependence on the length of the said articles in said given direction, said control means being operable to couple a plurality of said phaser conveyors of said set together such that the coupled said phaser conveyors act as a single conveyor with a length equal to the sum of the lengths of the individual coupled said phaser conveyors;

wherein when two or more phaser conveyors are coupled, said control means is selectively operable to control the speed of movement of said coupled phaser conveyors in dependence on the sensor signal generated by associated sensor means, at the end of a phaser conveyor, which occupies a position not downstream of said coupled phaser conveyors.

8. In a device for regulating the advancing movement of articles in a given direction comprising:

a plurality of phaser conveyors positioned in cascade, said phaser conveyors determining said given direction;

control means associated with said phaser conveyors for selectively controlling the speed of movement of said phaser conveyors whereby correspondingly to vary the speed of advancing motion of said articles carried on said phaser conveyors;

the improvement wherein:

at least some of said phaser conveyors are made of a different length from one another as measured in said given direction whereby to constitute a set;

said control means acts to control the speed of movement of selectively determined combinations of said phaser conveyors of said set in dependence on the length of the said articles in said given direction;

wherein said phaser conveyors include a downstream end phase conveyor, situated at the furthest downstream position of said set of phaser conveyors, and wherein the active length of said downstream end phaser conveyor is selectively variable in dependence on the length of said articles in said given direction.

9. The device of claim 8, wherein downstream of said downstream end phaser conveyor there is an output conveyor constituted substantially by a positive drive conveyor having article drive formations and a movable element associated with said positive drive conveyor, said movable element longitudinally translatable with respect to the device so as to vary selectively the position at which articles which move on to said downstream end phaser conveyor are engaged by said drive formations; the arrangement being such that the variation of said engagement position causes a variation in the useful length of the drive portion of said downstream end phaser conveyor.

10. The device of claim 9, wherein said output conveyor is a conveyor having prongs and, said downstream end phaser conveyor has means defining a transport plane, said prongs selectively emerging from said transport plane of said downstream end phaser conveyor.

11. The device of claim 9, wherein said control means includes a sensor which is associated with said movable element and which is able to control the speed control action of said downstream end phaser conveyor, translation of said movable element causing displacement of said sensor element with respect to said downstream end phaser conveyor.

12. A method of regulating the advancing movement of articles in a given direction by means of a plurality of phaser conveyors positioned in cascade, by selectively varying the speed of movement of said phaser conveyors and, consequently, the speed of advancing movement of said articles on said phaser conveyors comprising the operations of:

making at least some of said phaser conveyors with various lengths, measured in the direction of advancing movement of said articles so as to constitute a set; and selectively varying the speed of movement of selectively determined combinations of said phaser conveyors of said set in dependence on the length of said articles in said given direction.

13. The method of claim 12, further comprising the operation of selecting the lengths of said phaser conveyors of said set in a way that corresponds, for each phaser conveyor of the set, to an associated possible range of variation of said length of said articles in said given direction.

14. The method of claim 13, including the operation of selecting the lengths of said phaser conveyors of said set to correspond, for each phaser conveyor of said set, to approximately one and a half times the length of said articles in said possible range of variation of the lengths of said articles.

15. A method of regulating the advancing movement of articles in a given direction by means of a plurality of phaser conveyors positioned in cascade, by selectively varying the speed of movement of said phaser conveyors and, consequently, the speed of advancing movement of said articles on said phaser conveyors comprising the operations of:

making at least some of said phaser conveyors with various lengths, measured in the direction of advancing movement of said articles so as to constitute a set;

selecting gradually increasing lengths of said phaser conveyors of said set where the length of each said phaser conveyor in said set downstream of another phaser conveyor in said set immediately upstream thereof is equal to approximately 1.2 times the length of said upstream phaser conveyor; and     selectively varying the speed of movement of selectively determined combinations of said phaser conveyors of said set in dependence on the length of said articles in said given direction.

16. The method of claim 12, including the operation of coupling a plurality of said phaser conveyors of said set such that the coupled said phaser conveyors act as a single conveyor with a length equal to the sum of the lengths of the individual coupled said phaser conveyors.

17. The method of claim 12, including the operation of selectively varying the speed of movement of said phaser conveyors according to the position of said articles by means of associated sensor means, each of said sensor means being located at the end of an associated said phaser conveyor.

18. The method of claim 16, wherein when phaser conveyors are coupled, the speed of movement of coupled said phaser conveyors is regulated in dependence on the position of said articles by means of associated sensor means at the end of a phaser conveyor, which sensor means occupies a position not downstream of the group of coupled said phaser conveyors.

19. A method of regulating the advancing movement of articles in a given direction by means of a plurality of phaser conveyors positioned in cascade, by selectively varying the speed of movement of said phaser conveyors and, consequently, the speed of advancing movement of said articles on said phaser conveyors comprising the operations of:

making at least some of said phaser conveyors with various lengths, measured in the direction of advancing movement of said articles so as to constitute a set; and     providing a downstream end phaser conveyor situated at the downstream end of the set of said phaser conveyors:

selectively varying the active length of said downstream end phaser conveyor in dependence on the length of said articles in said given direction; and     selectively varying the speed of movement of selectively determined combinations of said phaser conveyors of said set in dependence on the length of said articles in said given direction.

20. The method according to claim 19, including the operation of positively drawing forward the articles once they have left a given position on said downstream end phaser conveyor, the variation in said given position determining the variation in usable length of the transport portion of said downstream end phaser conveyor.

\* \* \* \* \*